United States Patent [19]

Duensing et al.

[11] 4,112,129

[45] Sep. 5, 1978

[54] COOKING OIL TREATING SYSTEM AND COMPOSITION THEREFOR

[75] Inventors: Willard John Duensing, Lakewood; Christian John Miga, Littleton, both of Colo.

[73] Assignee: Johns-Manville Corporation, Denver, Colo.

[21] Appl. No.: 833,215

[22] Filed: Sep. 14, 1977

[51] Int. Cl.² .......................... A23D 5/02; C09F 5/10
[52] U.S. Cl. .................................. 426/417; 426/423; 260/428; 252/455 R
[58] Field of Search .................. 426/271, 417, 423; 260/428; 252/449, 455 R, 457

[56] References Cited

U.S. PATENT DOCUMENTS

| | | | |
|---|---|---|---|
| 3,099,626 | 7/1963 | Riede | 252/163 |
| 3,427,249 | 2/1969 | Riede et al. | 252/163 |
| 3,940,498 | 2/1976 | Butterworth et al. | 426/423 |
| 3,954,819 | 5/1976 | Husch | 260/428 |
| 3,976,671 | 8/1976 | Husch | 260/428 |

*Primary Examiner*—Robert A. Yoncoskie
*Attorney, Agent, or Firm*—Robert M. Krone; Joseph J. Kelly; James W. McClain

[57] ABSTRACT

A composition is disclosed which is useful for reduction (by as much as 50% or more) of the rate of free fatty acid buildup and color degradation in cooking oils in fast food outlets and other eating establishments. The composition consists essentially of three specifically defined components: 47 to 59 parts by weight diatomite, 28 to 36 parts by weight synthetic calcium silicate hydrate, and 12 to 24 parts by weight synthetic magnesium silicate hydrate. Also disclosed is a process for achieving such reduction by treating the oil (as by filtering) with the composition.

8 Claims, 3 Drawing Figures

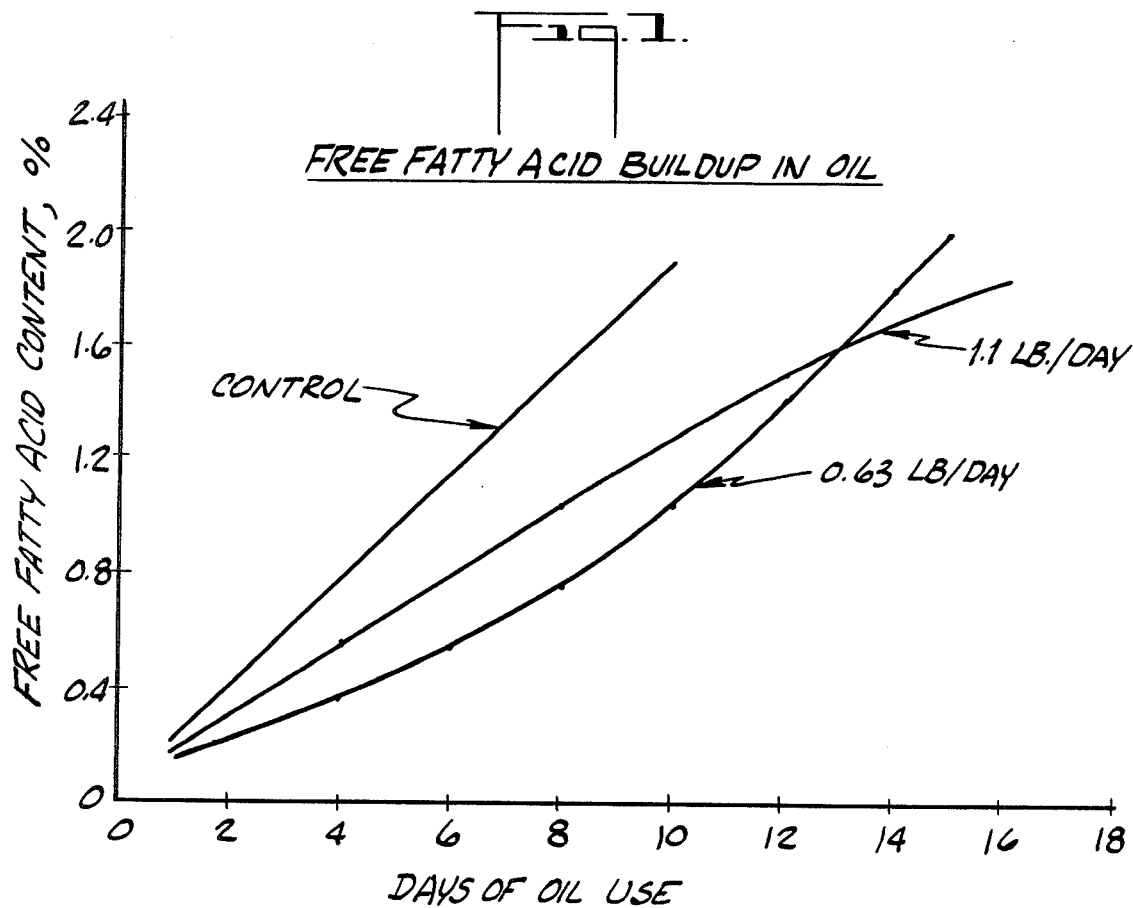
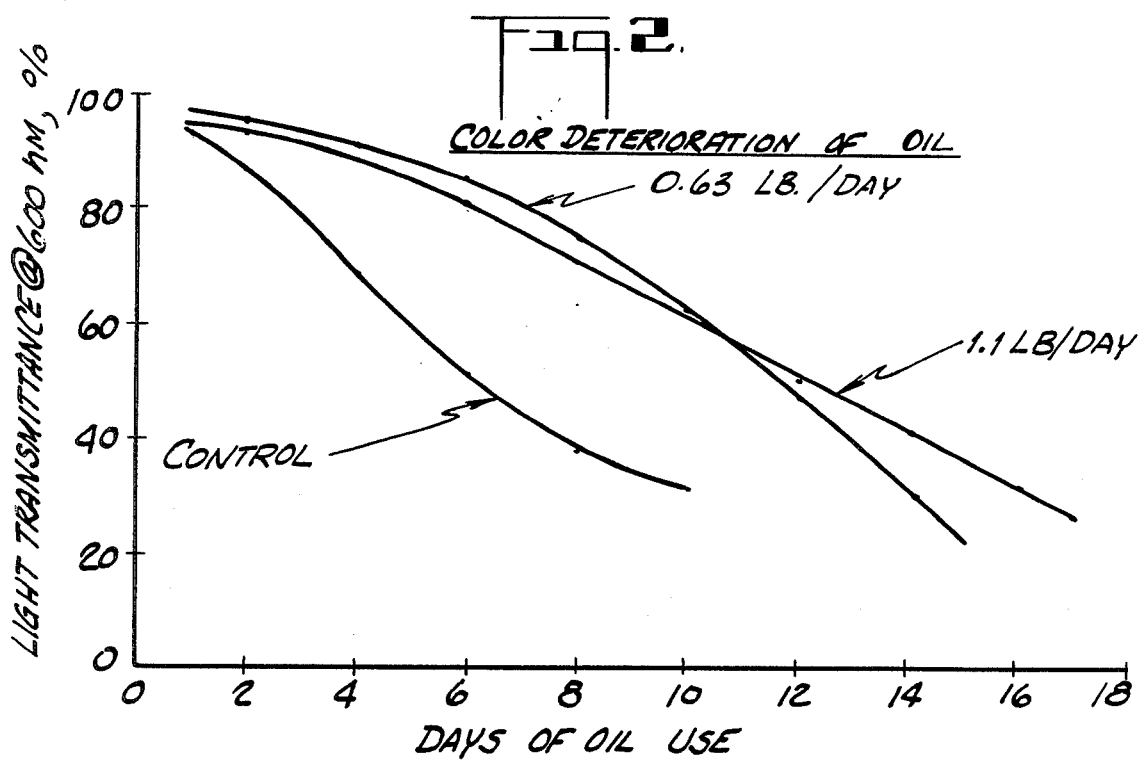

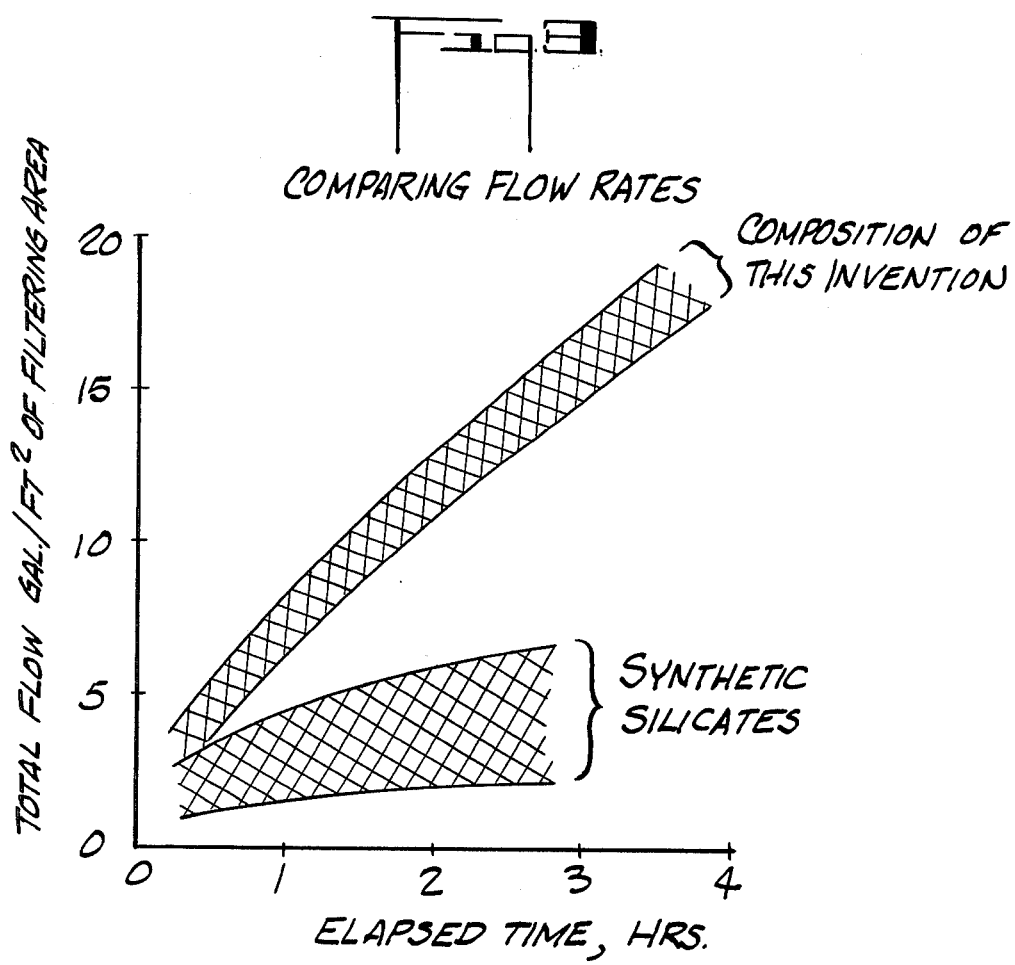

COOKING OIL TREATING SYSTEM AND COMPOSITION THEREFOR

BACKGROUND OF THE INVENTION

The invention herein relates to a system for treating cooking oils. More particularly it relates to a system for treating cooking oils which are operated at high temperatures for long periods of time.

In recent years there has been a substantial growth in the "fast food" type of restaurants. Many of these restaurants specialize in cooking and serving a limited variety of foods, most of them fried foods such as chicken, potatoes, pies and fish. In addition, most conventional restaurants also offer fried foods such as chicken and potatoes as part of their menus.

In these frying operations large quantities of edible cooking oils are heated in vats to temperatures on the order of approximately 350° F. to 375° F. (175° C. to 190° C.) and the food immersed in the hot oil for cooking. The oil is reused repeatedly for cooking subsequent batches of food and is maintained at these high temperatures for prolonged periods. During this continued operation the high temperature frying reactions cause the formation of free fatty acids (FFA) in the oil. In addition, the oil becomes badly discolored. The presence of the free fatty acids, which are the precursors of soaps, can impart to the food an objectionable taste. An increase in the FFA content also causes decreases in the oil's smoke point, flash point and fire point, all of which result in increasing smoke and fire hazards as the oil ages. The discolored oil can impart objectionable color to the food which, while not harmful in itself, is often interpreted by the consumer as indicating that the food is substandard.

In the past it has been conventional practice for the fast food outlets and restaurants to filter their cooking oils on a regular basis using conventional filter paper and/or filter aids. Some fast food outlets have used continuous filtration systems and others have used batch systems where the cooking oil is filtered completely 1 to 4 times per day. Filter aids such as perlite, diatomite and clay have been sold under various trade names for use in cooking oil filtration. These filter aids, however, serve only to remove solid particulate matter such as pieces of food or breading from the oils; they do not affect the concentration of FFA nor (with the exception of the bleaching clays) do they affect the color darkening of the oil. Synthetic calcium and/or magnesium silicate hydrates have been used in the past for treating of dry cleaners' solvents (see, e.g., U.S. Pat. Nos. 3,099,626 and 3,427,249). While these materials do serve as FFA adsorbents and/or color control agents, their normal physical structure is such that filtrate flow rate through them is exceedingly slow and therefore they are not satisfactory for use in restaurants and fast food outlets where large quantities of cooking oil must be filtered rapidly (see FIG. 3).

It has been found in practice that cooking oils used in the normal course of business of restaurants and fast food outlets, even if filtered regularly, become unusable within approximately 5 to 10 days because of the buildup of FFA and the excessive discoloration. It is thus evident that it would be of real advantage to have a treating agent which would function as both a filter aid and a high flow rate treating agent which would control the FFA buildup and reduce discoloration, thus prolonging the service life of cooking oil.

BRIEF SUMMARY OF THE INVENTION

The invention herein is a composition useful for the control of free fatty acids and color in cooking oils which consists essentially of, in parts by weight, 47 to 59 parts of diatomite, 28 to 36 parts of synthetic calcium silicate hydrate and 12 to 24 parts of synthetic magnesium silicate hydrate. In this composition the diatomite is a flux-calcined diatomite having a particle size distribution of approximately 20% to 30% less than 20 $\mu$m and 40% to 60% less than 30 $\mu$m with a dry bulk density of 10 to 14 lb/ft$^3$ (0.16 to 0.23 g/cm$^3$). The synthetic calcium silicate hydrate is formed by the hydrothermal reaction of calcium oxide and silica, having a CaO:SiO$_2$ weight ratio on the order of approximately 1:2, a dry bulk density of 6 to 10 lb/ft$^3$ (0.09 to 0.16 g/cm$^3$), a particle size distribution of at least about 95% $-35$ mesh and 8% $+325$ mesh (U.S. sieve series) and a permeability in the range of about 0.35 to 0.70 darcies. The synthetic magnesium silicate hydrate is formed by the hydrothermal reaction of magnesium oxide and silica, with an MgO:SiO$_2$ weight ratio on the order of 1:4; a dry bulk density of about 12 to 15 lb/ft$^3$ (0.19 to 0.24 g/cm$^3$), particle size distribution of at least 95% $-325$ mesh, and a surface area of about 150 to 200 m$^2$/g.

The invention also comprises a process for the extension of service life of cooking oil by reduction of the rate of increase of free fatty acids in the oil and a reduction in the rate of darkening of the oil which comprises passing the oil through a filter bed comprising a permeable mass of the composition of this invention.

BRIEF DESCRIPTION OF THE DRAWINGS

FIG. 1 is a graph showing the reduction in the rate of free fatty acid buildup using the process and composition of the present invention as compared to a prior art filtration system.

FIG. 2 is a similar graph showing the reduction in the rate of color deterioration of cooking oil.

FIG. 3 is a graph comparing typical flow rates through a bed of the material of this invention with flow rates through a bed of prior art synthetic silicate.

DETAILED DESCRIPTION AND PREFERRED EMBODIMENTS

The composition of this invention has three principal components, each of which is defined specifically in terms of it properties: a diatomite, a synthetic calcium silicate hydrate, and a synthetic magnesium silicate hydrate. In this composition the three separate components synergistically cooperate to provide filtration of solid particulate matter in cooking oils, relatively fast flow rates (filter through-put) which permit large amounts of oil to be filtered rapidly, and significant control of the buildup of discoloration and free fatty acids in the cooking oil, such that the oil service life can be extended by 50% or more.

The diatomite of this invention is a flux-calcined high flow rate diatomite having a particle size distribution of 20% to 30% less than 20 $\mu$m and 40% to 60% less than 30 $\mu$m with a dry bulk density of 10 to 14 lb/ft$^3$ (0.16 to 0.23 g/cm$^3$). The chemical composition of this diatomite is approximately 90% silica, 4% alumina, 3% alkali metal oxides, 1% iron oxide and less than 1% each of additional oxides such as calcium or magnesium oxide. It will normally have a specific gravity of approximately 2.3, a porosity in the range of 65% to 85%, a water content of less than 1% and a pH in the range of 8.5 to 10. Diatomite of this type is commercially available from the Johns-Manville Corporation under the trademark CELITE. The diatomite will be present in the composition of this invention as 47 to 59 parts by weight of the composition, preferably 53 to 57 parts by weight.

The synthetic calcium silicate hydrate of this invention is a hydrous calcium silicate formed by the hydrothermal reaction of calcium oxide and silica. Commonly these oxides will be in the form of lime and a siliceous material such as diatomite or silica sand. The mole ratio of the calcium oxide to silica will be on the order of approximately 1:2 and may range from approximately 1 part of calcium oxide to 1.5 to 2.5 parts by weight of silica. Preferably the ratio will be 1 part of lime to 1.7 to 1.9 of silica. Because of the nature of the raw materials it is normal to find small amounts of other oxides such as alumina, alkali metal oxides and magnesia present in the hydrothermal reaction product; these may be in a total amount up to 10% of the calcium silicate hydrate.

It is critical to the composition and process of this invention that the synthetic hydrous calcium silicate have a particle size distribution significantly coarser than conventional commercial hydrous calcium silicates. Commercial synthetic hydrous calcium silicates commonly have particle size distributions of 1% to 5% +325 mesh, usually 1% to 2% +325 mesh, and permeabilities in the range of 0.05 to 0.14 darcies. The synthetic hydrous calcium silicate of the present invention, however, will have a minimum of 8% +325 mesh and preferably at least 10% +325 mesh. In addition, the synthetic hydrous calcium silicate will have a bulk density in the range of from 6 to 10 lb/ft$^3$ (0.09 to 0.16 g/cm$^3$), a pH on the order of 9.5 to 10 and a moisuture content of approximately 4% to 11%, generally about 6% to 7%, a specific gravity on the order of 2.2 to 2.3, and a permiability in the range of about 0.35 to 0.70 darcies. The synthetic calcium silicate will be present as 28 to 36 parts by weight, preferably 30 to 34 parts by weight, of the compositon.

The third component of the composition of the present invention is a synthetic magnesium silicate hydrate. This is the hydrous reaction product of the hydrothermal reaction of magnesium oxide and silica with the magnesia-to-silica weight ratio being in the range from 1 part of magnesia to 3.5 to 5.5 parts of silica, preferably about 1:4 to 1:5. In addition to silica and magnesia, the reaction may also contain small amounts of other oxides such as alumina, iron oxide and alkali metal oxide, normally in amounts not to exceed a total of approximately 10% by weight. Water content of non-chemically combined water is approximately 1% to 5%. The hydrous magnesium silicate reaction products will have a bulk density in the range of 10 to 15 lb/ft$^3$ (0.16 to 0.25 g/cm$^3$), a particle size distribution of at least 95% −325 mesh, a pH in the range of 7 to 8 and a specific gravity on the order of about 2.4. Synthetic magnesium silicate hydrates of this type are available commercially from the Johns-Manville Corporation under the trademark CELKATE. The synthetic magnesium silicate hydrate will be present in the composition of this invention in an amount of from 12 to 24 parts by weight, preferably 13 to 17 parts by weight, of the composition.

Following their individual formation the three components may be blended into the composition of this invention by any conventional means for thoroughly mixing solid powders. A number of suitable mixing devices are described in Perry et al, *Chemical Engineers' Handbook* (5th edn., 1973), beginning at page 21–30.

The composition of this invention can be used to treat hot cooking oils in any of the conventional cooking oil filtration operations at fast food outlets and restaurants. Some of these types of outlets use continuous filtration systems in which the used oil is continuously circulated through filtration units and back to the frying vats. Other outlets (perhaps the majority) use batch systems where one or more times a day the contents of each frying vat are filtered through a batch-type filter. The filtered oil is then returned to the frying vat. Depending on the amount of use of any given vat and the type of food which is being cooked in the vat, the oil may be batch filtered 1 to 5 times per day. The composition of this invention is used as both a precoat and a body feed in either a continuous or batch filtration system. Precoats of ¼ to ½ inch (6 to 12 mm) or more in thickness have been found to be quite satisfactory. The precoat may be discarded after each batch filtration or it may be allowed to build up through several filtrations and then discarded; it will be discarded at regular intervals if a continuous filtration system is used. In conventional cooking apparatus a dosage of 0.5 to 1.5 lbs (0.2 to 0.7 kg) of the composition of this invention per vat of cooking oil per day has been found to give up to 50% or more added service life to the cooking oil, based on conventional cooking vats containing approximately 6 to 12 gallons (23 to 45 liters) of cooking oil. This is equivalent to a dosage on the order of 0.5% to 2% of the composition of this invention based on weight of oil to be filtered.

The improved results obtained with the process and composition of this invention are illustrated in FIGS. 1 and 2. Tests were run at a fast food outlet in which chicken, potatoes and pies were deep fat fried. The test composition contained 55 parts diatomite, 30 parts synthetic calcium silicate hydrate and 15 parts synthetic magnesium silicate hydrate (all parts by weight). The composition permitted a flow rate on the order of the range shown in the upper curve in FIG. 3. The particular fast food outlet chosen for the test work normally used a continuous filtration system utilizing a commercial diatomite filter aid as the sole filtration medium in the system. Prior to incorporation of a composition of the present invention into the system, the system was monitored for an entire oil cycle using the conventional diatomite filter aid to determine the free fatty acid buildup and the color deterioration. The data obtained in the monitoring is shown plotted on the curves labeled "control" in FIGS. 1 and 2. It will be seen that in the conventional diatomite system FFA content buildup and color deterioration are relatively rapid, leading to an acceptable service life of only 7 to 10 days. Thereafter runs were made using the above composition in place of the diatomite filter aid in the filtration system. In one series of tests 0.63 lb/day (0.29 kg/day) were used and in another series 1.1 lb/day (0.50 kg/day) were used. The data collected in these runs are also shown plotted on FIGS. 1 and 2. In each case it will be immediately evident that the service life of the cooking oil was substantially extended to periods of 2 weeks or more by use of the composition of the present invention.

In addition to substantially improving the service life by reducing the rate of FFA buildup and color deterioration, the composition of this invention imparts no "off-taste" to the food or is otherwise detrimental. All components are acceptable to FDA and USDA for use in food preparation systems.

What is claimed is:

1. A composition useful for the control of free fatty acids and color in cooking oils, which consists essentially of, in parts by weight:

diatomite: 47 to 59 parts
synthetic calcium silicate hydrate: 28 to 36 parts
synthetic magnesium silicate hydrate: 12 to 24 parts wherein;
(a) said diatomite is a flux-calcined diatomite having a particle size distribution of approximately 20% to 30% less than 20 μm and 40% to 60% less than 30 μm with a dry bulk density of 10 to 14 lb/ft$^3$;
(b) said synthetic calcium silicate hydrate is formed by the hydrothermal reaction of calcium oxide and silica, having a $CaO:SiO_2$ weight ratio in the range of approximately 1:1.5 to 1:2.5, a dry bulk density of 6 to 10 lb/ft$^3$, a particle size distribution of at least about 95% −35 mesh and 8% +325 mesh and a permeability in the range of about 0.35 to 0.70 darcies; and
(c) said synthetic magnesium silicate hydrate is formed by the hydrothermal reaction of magnesium oxide and silica, with an $MgO:SiO_2$ weight ratio on the order of 1:3.5 to 1:5.5; a dry bulk density of about 12 to 15 lb/ft$^3$, particle size distribution of at least 95% −325 mesh, and a surface area of about 150 to 200 m$^2$/g.

2. A composition as in claim 1 consisting essentially of, in parts by weight:
said diatomite: 53 to 57 parts
said synthetic calcium silicate hydrate: 30 to 34 parts
said synthetic magnesium silicate hydrate: 13 to 17 parts.

3. A composition as in claim 2 consisting essentially of, in parts by weight:
said diatomite: 55 parts
said synthetic calcium silicate hydrate: 30 parts
said synthetic magnesium silicate hydrate: 15 parts.

4. A composition as in claim 1 wherein said synthetic calcium silicate hydrate has a particle size distribution of at least about 10% +325 mesh.

5. A process for the reduction of the rate of color degradation and free fatty acid buildup in cooking oil which are maintained at elevated temperatures for prolonged periods, which comprises treating the oil by contact with the composition of claim 1.

6. A process as in claim 5 wherein said contacting comprises filtering said oil through a permeable mass of said composition.

7. A process for the reduction of the rate of color degradation and free fatty acid buildup in cooking oil which are maintained at elevated temperatures for prolonged periods, which comprises treating the oil by contact with the composition of claim 3.

8. A process as in claim 7 wherein said contacting comprises filtering said oil through a permeable mass of said composition.